United States Patent [19]

Chen

[11] 4,385,325

[45] May 24, 1983

[54] RASTER INPUT SCANNER COMPRISING TWO CCD ARRAYS

[75] Inventor: Philip L. Chen, Rancho Palos Verdes, Calif.

[73] Assignee: Xerox Corporation, Stamford, Conn.

[21] Appl. No.: 141,084

[22] Filed: Apr. 17, 1980

[51] Int. Cl.³ .................. H04N 1/10; H04N 1/028
[52] U.S. Cl. .................................... 358/294; 358/293
[58] Field of Search ............... 358/213, 285, 293, 294; 355/43, 45, 49, 51, 57, 60, 65, 66; 350/484, 485

[56] References Cited

U.S. PATENT DOCUMENTS

| | | | |
|---|---|---|---|
| Re. 29,067 | 12/1976 | Watson | 358/293 |
| 862,354 | 8/1907 | Stevens . | |
| 1,532,236 | 4/1925 | Douglass . | |
| 2,403,733 | 7/1946 | Mainardi et al. | 88/16.6 |
| 2,736,250 | 2/1956 | Papritz | 95/18 |
| 3,674,339 | 4/1972 | Sayanagi | 350/130 |
| 3,776,995 | 12/1973 | Little, Jr. | 350/484 |
| 3,893,079 | 7/1975 | Shepard et al. | 358/293 |
| 4,173,411 | 11/1979 | Massengeil et al. | 355/8 |
| 4,205,349 | 5/1980 | Kawazu et al. | 358/294 |
| 4,272,684 | 6/1981 | Seachman | 358/293 |
| 4,318,135 | 3/1982 | Allis et al. | 358/294 |

OTHER PUBLICATIONS

Janeway et al.—Multiple Diode Array Optics—IBM Tech. Disclosure Bulletin—vol. 20, #1, Jun. 1977, pp. 18, 19.

Primary Examiner—Joseph A. Orsino, Jr.
Attorney, Agent, or Firm—Robert E. Cunha

[57] ABSTRACT

A raster input scanner (RIS) comprising a platen and light source, doubling mirror, lens and two CCD arrays for producing a bit stream output with twice the resolution produceable with a single CCD is disclosed. The doubling mirror is between the platen and lens, and produces two beams separated by a small angle. The lens focuses these beams as two lines at the image plane, where half of each intersects each CCD array. Glass plates, each intersecting and perpendicular to each beam, and rotatable about orthogonal axes, provide horizontal and vertical fine tuning.

2 Claims, 9 Drawing Figures

RASTER INPUT SCANNER COMPRISING TWO CCD ARRAYS

BACKGROUND OF THE INVENTION

This application describes an optical raster input scanner (RIS) system for use in a copier or duplicator which accurately and conveniently aligns two CCD array devices to produce an office-quality copy at twice the resolution otherwise obtainable.

CCD arrays with up to two thousand elements per package are commercially available and can be used with optical scanners to generate an electrical input to a copier or duplicator. This electrical input may be used in its analog form to drive an output printer, or may be thresholded into digital form or screened into halftone form before being sent to a printer.

If an original of approximately ten inches is scanned into a CCD array of approximately two thousand elements, a resolution of 200 pixels per inch is obtained, about half of that required for an office-quality copy.

Two arrays may be used to double the resolution, but splitting the image into two parts and then locating each CCD array to recreate half of the image results in the creation of a visible splice line through the center of the copy. Of course, the use of standard precision optical equipment and alignment procedures in the system can result in a sufficiently accurate alignment of CCD arrays to produce a perfect copy, but the resultant system is not produceable at commercial prices.

For commercial use, the requirements are that (1) the system parts must be small, light in weight and simple in design, (2) the factory alignment procedure for originally positioning the mirrors, lens and CCD arrays must be performable in a minimum amount of time, and (3) the CCD arrays must be easily replaceable in the field. This last requirement is complicated by the fact that CCD arrays are not accurately positioned in their device packages so that each CCD array of elements, and not the package outline, is the entity which must be aligned with the remainder of the system. An additional requirement is that the image should be split on the object side of the lens for greater light efficiency.

SUMMARY OF THE INVENTION

All of the above objectives are satisfied by the inventive system which comprises a beam splitting mirror, or image doubler which reflects two complete images of the original document through a lens and onto two CCD arrays positioned so that each array receives one half of the image. At the factory, the positions of several folding mirrors are set in relation to the platen by auto-collimation using an alignment tool and a laser. Next, the lens is assembled into the system and is aligned by projecting a calibrated object plane target placed on the platen through the lens and onto an image plane target where the image is observed by use of a microscope. The lens is adjusted for focus and registration of the image at the image plane, and the CCD base plate is also fixed into position.

To remedy the inaccurate positioning of the CCD array in its package, the CCD is accurately positioned and then cemented onto a "picture frame". These CCD parts thus become identical and can be placed, without further alignment, into the CCD base plate, or can be used as "drop in" replacements in the field.

To the extent that any significant error exists in the system after the insertion or replacement of the CCD arrays because of a build-up of tolerances, a fine tuning capability in the form of two parallel glass plates, positioned between the object and lens, each intersecting and approximately perpendicular to the beam of each image, may be provided. Each plate can be rotated about one axis, resulting in a translational movement of the image of several thousandths of an inch at the image plane. These plates thus provide simple horizontal fine tuning for one image and vertical fine tuning for the other.

The resultant system is characterized by low cost parts, a simple and fast factory alignment procedure, and a convenient CCD array replacement procedure in the field.

DETAILED DESCRIPTION OF THE INVENTION

Figure 1:
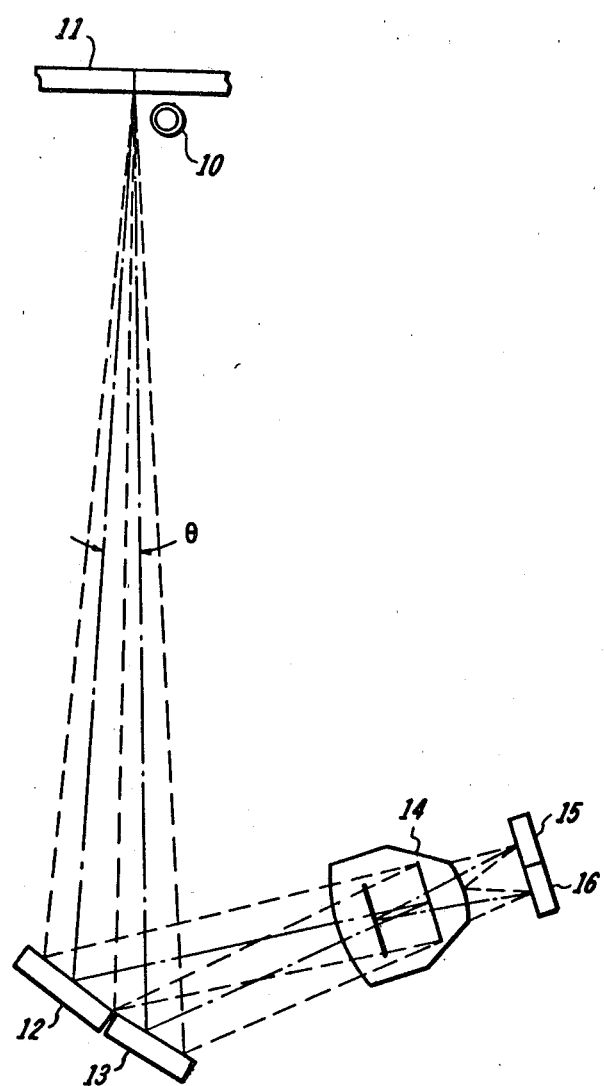
FIG. 1 is a simplified drawing of the entire system.

FIG. 1 is a schematic representation of the system. Light from source 10 illuminates an original placed on platen 11. Each image doubler half 12,13 reflects one image through the lens 14 to one of the CCD arrays 15,16.

In the prior art, a beam is more commonly doubled by using a beam splitter between the lens and image plane, resulting in a maximum theoretical light efficiency of 50%. Using the image doubler of FIG. 1 produces two complete images and raises the maximum theoretical light efficiency to 100%.

Figure 2:
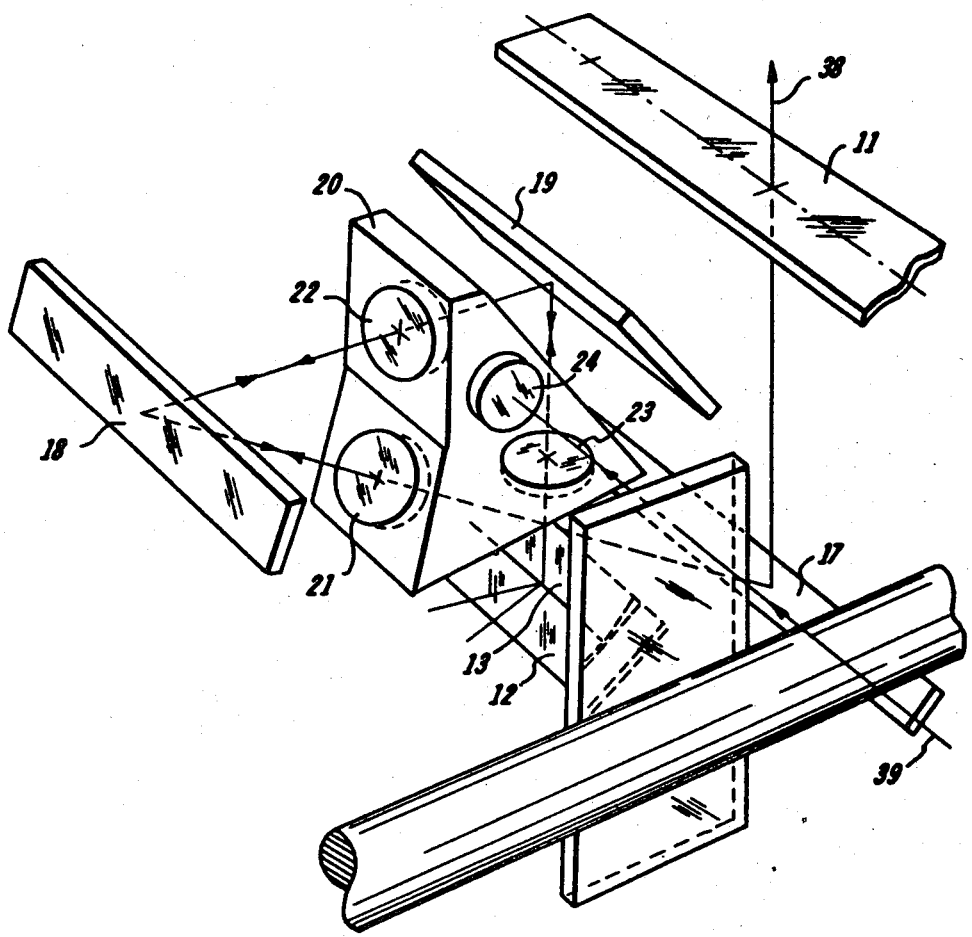
FIG. 2 is a detailed drawing of the alignment tool and the folding mirrors.

Because of the relatively long distance between the platen 11 and the image doubler 12, folding mirrors 17, 18, 19 as shown in FIG. 2 are used in the actual system. Light reflected from an original on the platen 11 is reflected by mirrors 17, 18 and 19 onto the image doubler surfaces 12, 13. These mirrors are adjustable and are aligned by auto collimation using a laser beam 38 and alignment tool 20 comprising three flat glass plates 21, 22 and 23.

First the alignment tool is positioned in relation to the platen 11 and image doubler 12, 13 so that, in the finally aligned state, a light beam passing through the center of the platen 11, as shown, will pass perpendicularly through all glass plates 21, 22, 23. The alignment tool 20 is initially positioned through the use of a laser beam 39 and the alignment tool end mirror 24. Next, the laser beam is directed through platen 11, against mirror 17 and through glass plate 21, but is blocked before reaching mirror 18. The laser beam reflected from first glass plate 21 is viewed above the platen and the first folding mirror 17 is aligned. Next, the block is positioned between the second glass plate 22 and the third mirror 19 while the second mirror 18 is aligned. Finally, the block is moved to a position between the third glass plate 23 and the image doubler 12, 13 and the third mirror 19 is aligned.

Figure 3:
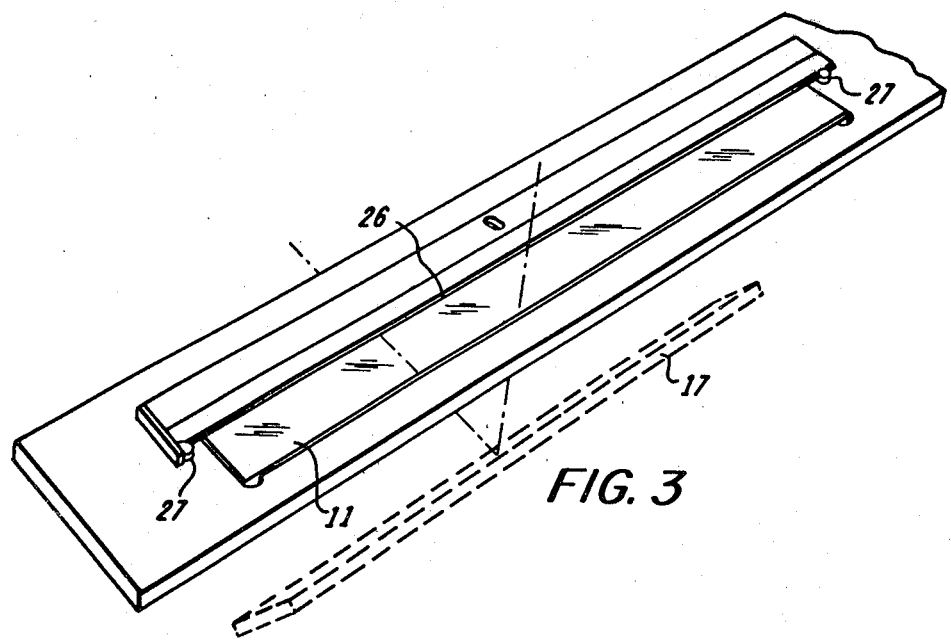
FIG. 3 is a drawing of a target on the platen.
Figure 4:
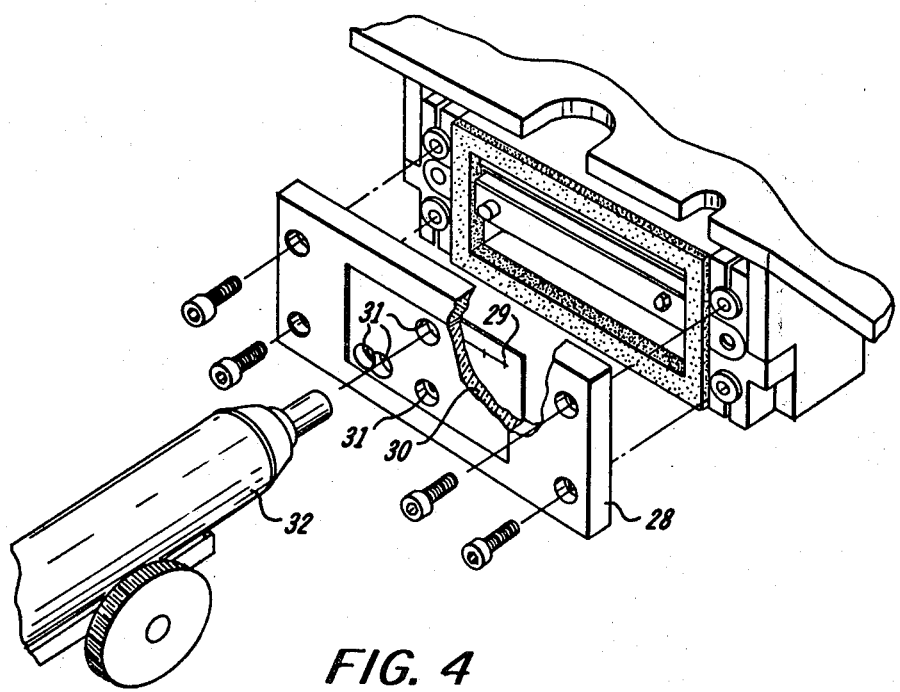
FIG. 4 is the microscope set up for aligning the image plane target.

The next elements to be installed and aligned are the image doubler 12, 13 and the lens 25. An object plane target 26 comprising a straight edge and scribe lines at the center, ± full field and ±0.7 field is placed on the platen 11 of FIG. 3 and positioned there by means of pins 27. This object plane target 26 is then illuminated and the image is projected through the lens 25 and image doubler 12, 13 onto the image plane target 28 of FIG. 4 on which is mounted the target film 29. The image plane target 28 has a steel substrate 30 in which are drilled viewing holes 31. A microscope 32, as shown in FIG. 4, is used to view the center, ±0.7 and full field scribe marks on the target film 29 through the holes 31. Since the target film 29 has scribe marks etched on it, the reduction ratio, object distance, image distance and image registration are measured and corrected by repositioning the image doubler 12, 13 and the lens 14. Focus is also checked and adjusted using this microscope 32.

Figure 5:
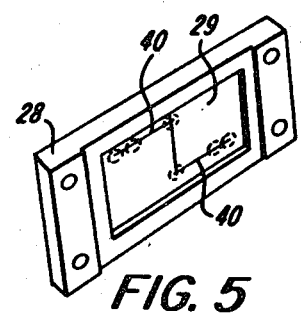
FIG. 5 is a simplified diagram of the image plane target.

FIG. 5 is another view of the image plane target 28 showing the scribe marks 40 on the mounted target film 29.

Since each imaging lens has its unique focal length due to manufacturing tolerances, the image distance also varies for a fixed reduction ratio. Also, the vertical separation between the two images is proportional to the focal length variation. It is, therefore, necessary to measure this vertical separation for each system after the lens is installed. This is done with the microscope 32 in the set-up of FIG. 4 by comparing the image to the image plane target 28. Any effect of the folding mirrors 17, 18, 19 is included when this separation is measured.

Figure 6:
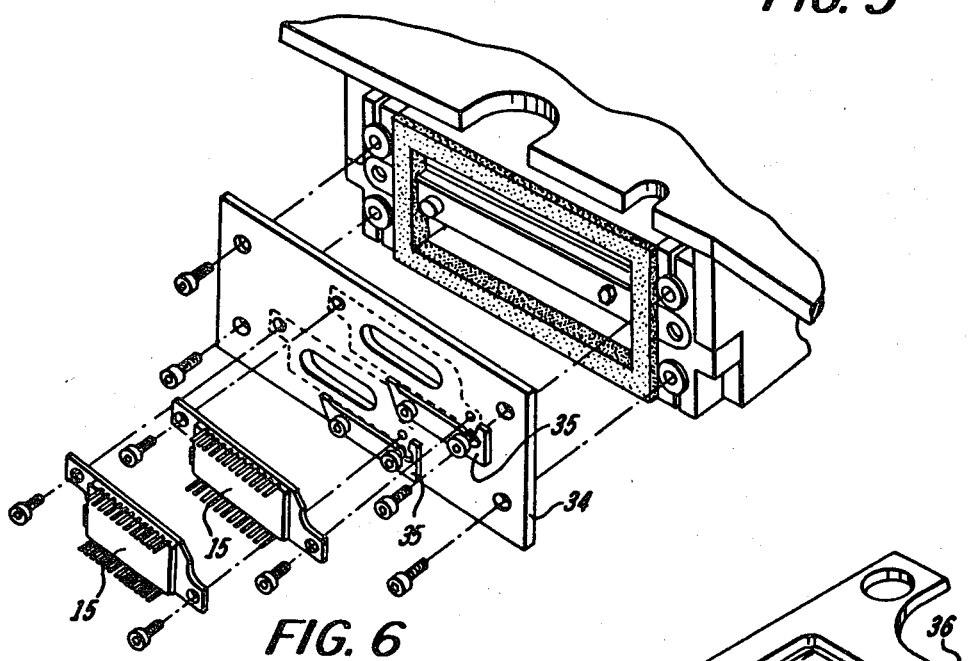
FIG. 6 is an exploded view of the base plate, CCDs and registration plates.

In the final assembly of the system, as shown in FIG. 6, the image plane target 28 is removed and replaced with the base plate 34 on which are positioned two registration plates 35. These registration plates 35 are positioned with respect to the base plate 34 according to the vertical separation measurement described above. Thus, after the base plate 34 is installed in the system the two CCDs 15 can simply be positioned against the registration plates 35 and bolted in place.

Figure 7:
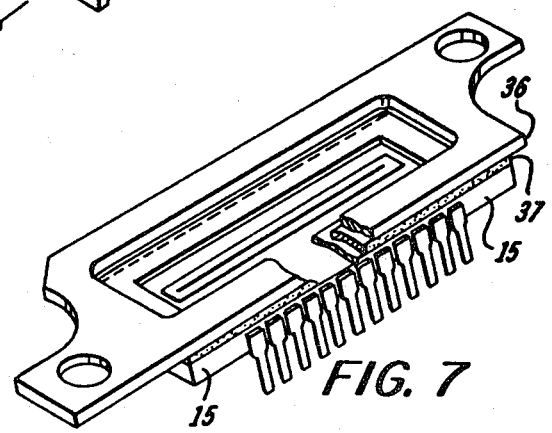
FIG. 7 is a detailed view of a CCD and its picture frame.

The CCDs, as received from the manufacturer, are not accurately positioned within their packages and are, therefore, unuseable in the system of FIG. 6 without first being cemented to a "picture frame" 36. FIG. 7 is a detailed diagram of the CCD package 15, the picture frame 36 and a cement layer 37.

The procedure is to use an XYZ table and microscope to locate the CCD array to within +0.0002 inches of a point directly under the microscope, and therefore, a precise location in relation to a picture frame holder which is a part of the alignment apparatus. Next, a layer of cement 37 is applied to the CCD package 15 and the picture frame 36 is set into the holder and thereby cemented to the CCD package 15. The result is a standard part which may be dropped into the base plate 34 of FIG. 6.

An advantage of the system described herein is that the angle between the two images (O of FIG. 1) is small, about 2.5 degrees in the described embodiment, allowing the image doubler halves 12, 13 to be located close together, or preferably, to be constructed in one price. One method of constructing this image doubler is to cement two mirrors together, but a better method is to replicate the mirrors from a master prism. Replication is a well known technique for creating an image doubling mirror by molding an image doubling mirror metal substrate to the surface of a master prism. The resultant doubling mirror has a single metal substrate and is therefore superior in rigidity, simplicity, permanancy of alignment, and temperature stability. It is, therefore, well suited for use in the image doubling system described herein.

Figure 8:
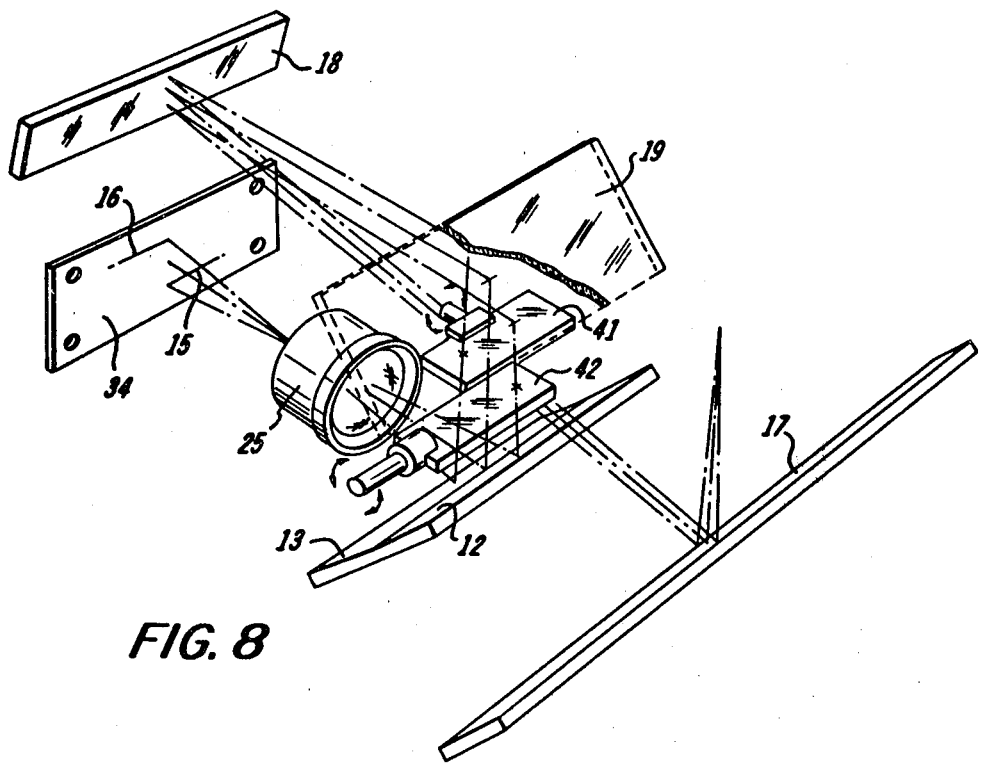
FIG. 8 is a diagram showing the positioning of the parallel plates in the system.
Figure 9:
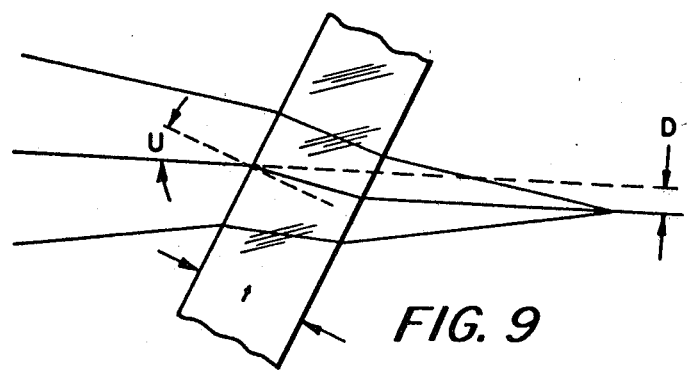
FIG. 9 is a diagram showing how a parallel platen is used to adjust the image position.

FIG. 8 is a view of the system showing the positioning of the parallel plates in relation to the two beams. In this view the beams are substantially vertical as they are reflected between the folding mirror 19 and doubler 12, 13. As shown, each parallel plate intersects one beam, and each is rotationally adjustable about an axis perpendicular to each other and to the beam. A glass plate as shown in FIG. 9, of thickness t, substantially perpendicular to a beam of light being focused at a point but displaced by an angle u, will shift the point of focus laterally by a distance D. Therefore, the rotation of the parallel plates 41, 42 of FIG. 8 provide a fine positional adjustment in case the location of the CCDs is slightly in error after a replacement, in the field for example.

In this case, the correction procedure is to run a copy of a test pattern specifically designed to show clearly if the CCDs are not "stitching" properly. If a copy shows an improper alignment, the parallel plates are adjusted.

The distance between CCD elements is approximately a half thousandth of an inch, but the correction distance D of FIG. 9 is so small for small values of rotation U, that the adjustment is easily made.

The invention is not limited to any of the embodiments described above, but all changes and modifications thereof not constituting departures from the spirit and scope of the invention are intended to be covered by the following claims.

What is claimed is:

1. A high resolution raster input scanner of the type having a platen for holding an original, a light source for illuminating one scan line of said original, a doubling mirror which is adapted to create two scan line image beams, a lens for focusing said scan line beams onto an image plane, and two CCD devices, each comprising an array contained in a package, at said image plane, and located so that each CCD array intersects one half of a scan line, the improvement comprising two frames to which said CCD devices are permanently attached, the CCD arrays, and not the packages, being accurately located with respect to said frames, and wherein said raster input scanner further comprises registration means adapted to lock said two frames into predetermined fixed locations on said registration means so that when said registration means is accurately and permanently fixed in position with respect to said scanner, said CCD arrays will each intersect one half of said scan line at said image plane, and so that a replacement CCD device and its associated attached frame may be replaced on said registration means without requiring further alignment.

2. The apparatus of claim 1 wherein cement is used to permanently attach said CCD devices to said frames, and said frames are removeably bolted into position onto said registration means.

* * * * *